US008725991B2

(12) United States Patent
Wang et al.

(10) Patent No.: US 8,725,991 B2
(45) Date of Patent: May 13, 2014

(54) REGISTER FILE SYSTEM AND METHOD FOR PIPELINED PROCESSING

(75) Inventors: Lin Wang, Austin, TX (US); Masud Kamal, Pflugerville, TX (US); Paul Bassett, Austin, TX (US); Suresh Venkumahanti, Austin, TX (US); Jian Shen, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1550 days.

(21) Appl. No.: 11/853,866

(22) Filed: Sep. 12, 2007

(65) Prior Publication Data

US 2009/0070554 A1    Mar. 12, 2009

(51) Int. Cl.
*G06F 9/30* (2006.01)
*G06F 9/40* (2006.01)
*G06F 15/00* (2006.01)

(52) U.S. Cl.
USPC ......................................... 712/200

(58) Field of Classification Search
USPC ......................................... 712/225
See application file for complete search history.

(56) References Cited

U.S. PATENT DOCUMENTS

| 5,778,243 A | 7/1998 | Aipperspach et al. | |
| 6,904,511 B2 * | 6/2005 | Hokenek et al. | 712/26 |
| 2006/0212687 A1 | 9/2006 | Chen et al. | |

FOREIGN PATENT DOCUMENTS

| JP | 10097461 A | 4/1998 |
| JP | 2002140200 A | 5/2002 |
| JP | 2005529383 A | 9/2005 |
| JP | 2006502504 | 1/2006 |
| JP | 2006509291 A | 3/2006 |
| JP | 2006260571 A | 9/2006 |
| JP | 2006302261 A | 11/2006 |
| JP | 2008507034 A | 3/2008 |
| KR | 20050054998 A | 6/2005 |
| WO | 03085520 A2 | 10/2003 |
| WO | 2004034209 | 4/2004 |
| WO | WO2004051450 | 6/2004 |
| WO | 2006017135 A2 | 2/2006 |

OTHER PUBLICATIONS

Powell et al.; Heat-and-Run: Leveraging SMT and CMP to Manage Power Density Through the Operating System; ASPLOS'04; Oct. 2004.*
Zang et al.; Duplicated Register File Design for Embedded Simultaneous Multithread Microprocessor; 2005; IEEE.*

(Continued)

*Primary Examiner* — Corey S Faherty
(74) *Attorney, Agent, or Firm* — Nicholas J. Pauley; Peter Michael Kamarchik; Joseph Agusta

(57) ABSTRACT

The present disclosure includes a multi-threaded processor that includes a first register file associated with a first thread and a second register file associated with a second thread. At least one hardware resource is shared by the first and second register files. In addition, the first thread may have a pipeline access position that is non-sequential to the second thread. A method of accessing a plurality of register files is also disclosed. The method includes reading data from a first register file while concurrently reading data from a second register file. The first register file is associated with a first instruction stream and the second register file is associated with a second instruction stream. The first instruction stream is sequential to the second instruction stream in an execution pipeline of a processor, and the first register file is in a non-adjacent location with respect to the second register file.

8 Claims, 5 Drawing Sheets

(56) References Cited

OTHER PUBLICATIONS

European Search Report—EP08006069, Search Authority—The Hague—Aug. 18, 2008.
Glossner J et al: "Sandblaster Low Power DSP" Costum Integrated Circuits Conference, 2004. Proceedings of the IEEE 2004 Orlando, FL, USA Oct. 3-6, 2004, Piscataway, NJ, USA, IEEE, (Oct. 3, 2004), pp. 575-581.
International Search Report—PCT/US08/076249, International Search Authority—European Patent Office—Dec. 16, 2008.
Written Opinion—PCT/US08/076249, International Search Authority—European Patent Office—Dec. 16, 2008.

* cited by examiner

REGISTER FILE SYSTEM AND METHOD FOR PIPELINED PROCESSING

I. FIELD

The present disclosure is generally related to a register file system and method for pipelined processing.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs) are frequently used in portable personal computing devices, such as wireless telephones. Such DSPs can be utilized to provide video and audio functions, to process received data, or to perform other functions. Such DSPs can employ pipelined and/or parallel execution units.

A register file in a modern microprocessor or a DSP consumes considerable power due to its relative size, width of its data buses, and length of its wire traces. In certain processors, multiple register files are used and such register files contribute to the overall power consumption of the device. Additionally, the layout of the multiple register files in adjacent areas of a circuit device may increase power consumption density and contribute to inefficiencies due to circuit heating. Hence, there is a need for an enhanced register file structure and method of using register files.

III. SUMMARY

In a particular embodiment, a multi-threaded processor is disclosed. The processor includes a first register file associated with a first thread and a second register file associated with a second thread. At least one hardware resource is shared by the first and second register files. In addition, the first thread has a pipeline access position that is non-sequential to the second thread.

In another particular embodiment, the processor includes a first register file associated with a first instruction execution stream and a second register file associated with a second instruction execution stream. The first and second execution streams are pipelined in a sequential manner and the first register file is located in a non-adjacent position with respect to the second register file to allow hardware resource sharing between the first register file and a third register file.

In another particular embodiment, the processor includes a first execution pipeline to execute a first instruction stream, a second execution pipeline to execute a second instruction stream, a first register file associated with the first instruction stream, and a second register file associated with the second instruction stream. The first and second instruction streams are configured within the first and second execution pipelines with non-sequential access of the first and second register files to allow the first and second register files to share at least one hardware resource.

In another particular embodiment, a method of accessing a plurality of register files is disclosed. The method includes reading data from a first register file while concurrently reading data from a second register file. The first register file is associated with a first instruction stream and the second register file is associated with a second instruction stream. The first instruction stream is sequential to the second instruction stream in an execution pipeline of a processor, and the first register file is in a non-adjacent location with respect to the second register file.

In another particular embodiment, a method of selecting register files for access is disclosed. The method includes selectively enabling at least one of a first set of register files for access while concurrently enabling at least one of a second set of register files for access. The method further includes providing data from the at least one of the first set of register files to a first instruction unit associated with a first instruction stream, providing data from the at least one of the second set of register files to a second instruction unit associated with a second instruction stream, and executing the first and second instruction streams using at least one pipelined execution unit. The first set of register files share a first set of hardware resources and the second set of register files share a second set of hardware resources.

One particular advantage provided by embodiments of the register file system and method for pipelined processing is provided in reduced cost of manufacture, reduced power density during operation, or both.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
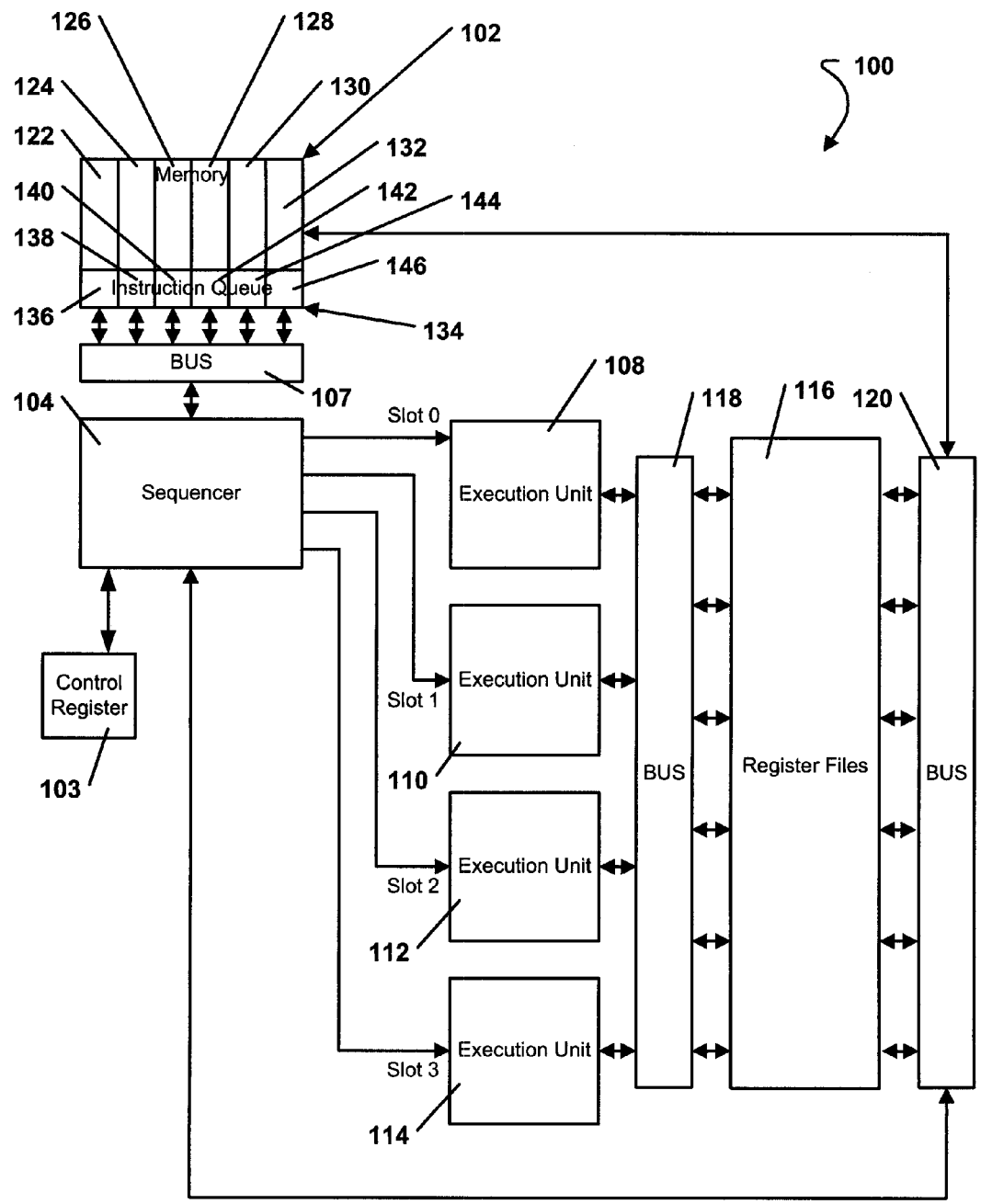
FIG. 1 is a block diagram of an embodiment of a processor that includes a register file system for pipelined processing.

Referring to FIG. 1, a processor 100 is disclosed. In a particular illustrative embodiment, the processor 100 may be a multi-threaded digital signal processor. The processor 100 includes a memory 102 having an instruction queue 134, a memory bus 107, a sequencer unit 104, a plurality of execution units 108-114, a first bus 118, a register file that has a structure to share hardware resources 116, and a second bus 120. The sequencer 104 is coupled to a control register 103. The memory 102 is coupled to the second bus 120 and the sequencer 104 is also coupled to the second bus 120.

In a particular embodiment, the memory bus 107 can be a sixty-four (64) bit bus and the sequencer 104 can be configured to retrieve instructions from the memory 102. In a particular illustrative embodiment, each instruction may have a length of thirty-two (32) bits. The sequencer 104 is coupled to a first instruction execution unit 108 via a first path (slot 0), to a second instruction execution unit 110 via a second path (slot 1), to a third instruction execution unit 112 via a third path (slot 2), and to a fourth instruction execution unit 114 via a fourth path (slot 3). Each instruction execution unit 108, 110, 112, and 114 can be coupled to a set of structured register files 116 via the first bus 118. The register files 116 can also be coupled to the sequencer 104 and to the memory 102 via the second bus 120.

In a particular embodiment, the memory 102 can be a content addressable memory (CAM) that includes a first instruction cache 122, a second instruction cache 124, a third instruction cache 126, a fourth instruction cache 128, a fifth instruction cache 130, and a sixth instruction cache 132. During operation, the sequencer 104 can access each of the instruction caches 122, 124, 126, 128, 130, and 132. Additionally, in a particular embodiment, each instruction cache 122, 124, 126, 128, 130, and 132 includes a plurality of instructions, instruction steering data for each instruction, and instruction pre-decode data for each instruction. The instruction queue 134 in the memory 102 may include an instruction queue 136, 138, 140, 142, 144, and 146 for each instruction corresponding cache 122, 124, 126, 128, 130, and 132.

The register files 116 include a first set of register files and a second set of register files. The first set of register files share at least one first hardware resource and the second set of register files share at least one second hardware resource. Example shared hardware resources include data read ports, data write ports, data read buses, data write buses, access logic, and wiring connections. In a particular embodiment, the register files 116 include six different register files where each of the six register files corresponds to one of the respective instruction caches 122, 124, 126, 128, 130, and 132 within the memory 102. Further, in a particular embodiment, each of the register files may have the same construction and may include an equal number of data operands and address operands.

FIG. 1 illustrates that the multi-threaded processor 100 can further include the control register 103 that is coupled to the sequencer 104. As shown, the control register 103 can be a stand-alone register.

During operation of the multi-threaded processor 100, instructions are fetched from the memory 102 by the sequencer 104, sent to selected instruction execution units 108, 110, 112, and 114, and executed at the instruction execution units 108, 110, 112, and 114. The results from the executed instruction at each instruction execution unit 108, 110, 112, and 114 can be written to one of the general register files 116. In a particular embodiment, the processor 100 is capable of executing multiple program threads. Further, in a particular embodiment, the processor 100 can be configured to execute up to six different program threads on an interleaved basis. Each of the program threads may comprise an instruction stream and each instruction stream may be executed in a pipelined fashion using one or more of the execution units 108, 110, 112, or 114.

Figure 2:
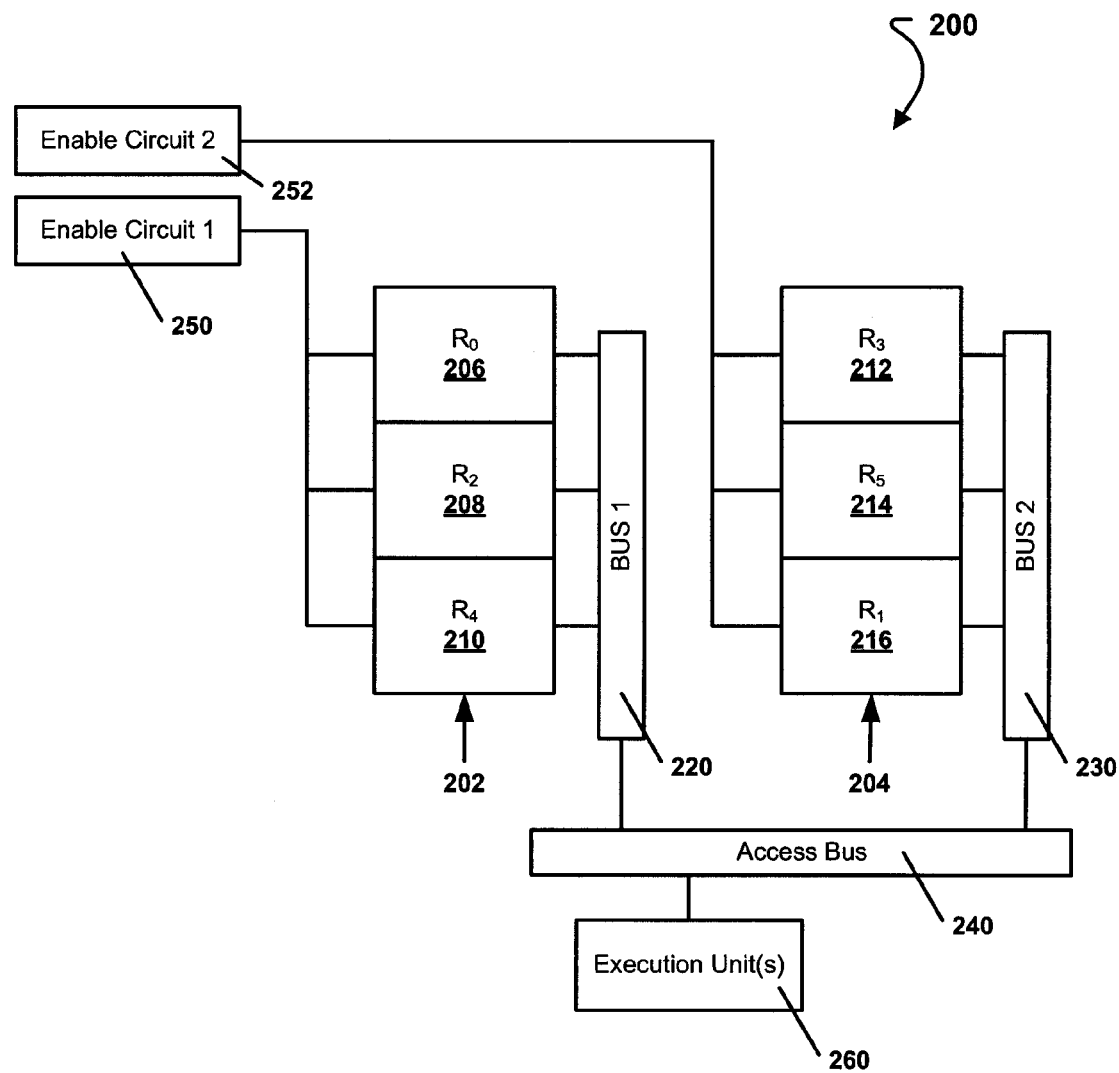
FIG. 2 is a block diagram of a portion of an embodiment of a physical layout of a register file system for pipelined processing.

Referring to FIG. 2, a portion of an embodiment of a physical layout of a register file system for pipelined processing is depicted and generally designated 200. The system 200 includes a first set of register files 202 and a second set of register files 204. The first set of register files 202 includes register files $R_0$ (206), $R_2$ (208), and $R_4$, (210). The second set of register files 204 includes $R_3$, (212), $R_5$ (214), and $R_1$ (216). A first bus 220 is coupled to each of $R_0$ (206), $R_2$ (208), and $R_4$ (210), to provide read access, write access, or any combination thereof, to each of the register files of the first set of register files 202. A second bus 230 is coupled to each of $R_3$ (212), $R_5$ (214), and $R_1$ (216), to provide read access, write access, or any combination thereof to each of the register files of the second set of register files 204. An access bus 240 is coupled to the first bus 220 and the second bus 230. The access bus 240 is further coupled to one or more execution units 260. A first enable circuit 250 is coupled to each register file of the first set of register files 202. A second enable circuit 252 is coupled to each register file of the second set of register files 204.

In a particular embodiment, each register file in the first set of register files 202 and in the second set of register files 204 is associated with an independent instruction execution stream. For example, $R_0$ (206) may be associated with a first execution stream, $R_1$ (216) may be associated with a second instruction execution stream, $R_2$ (208) may be associated with a third instruction execution stream, $R_3$ (212) may be associated with a fourth instruction execution stream, $R_4$ (210) may be associated with a fifth instruction execution stream, and $R_5$ (214) may be associated with a sixth instruction execution stream. In an illustrative embodiment, each of the instruction execution streams may correspond to a particular thread of a multi-threaded processor. In another embodiment, each of the instruction execution streams may be pipelined and may be interleaved. An instruction stream may include Very Long Instruction Word (VLIW)-type instructions, superscalar-type instructions, other types of instructions that may be pipelined, or any combination thereof.

In a particular embodiment, sequential pipelined instruction execution streams are associated with non-adjacent register files 206-216. For example, $R_0$ (206), associated with the first execution stream, and $R_1$ (216), associated with second execution stream, have sequential pipeline access positions but are located at non-adjacent physical locations. Further, register files 206-216 that are physically adjacent have non-sequential pipeline access positions. For example, $R_0$ (206) is physically adjacent to $R_2$ (208), but is associated with the first execution stream, while $R_2$ is associated with the third execution stream, which has a non-sequential pipeline access position to the first execution stream.

In an illustrative embodiment, a first execution stream that is associated with a first register file, such as $R_0$ (206), and a second execution stream that is associated with a second register file, such as $R_1$ (216), may have sequential pipeline access when the first and second register files are physically non-adjacent. A third register file, such as $R_2$ (208), that is associated with a third execution stream may be physically adjacent to the first register file when the third execution stream is non-sequentially pipelined with respect to the first execution stream.

In a particular embodiment, data access to multiple register files may occur concurrently. For example, a data read instruction executing at the first instruction execution stream, using $R_0$ (206), may perform a data read operation concurrently with a data read operation executing at the second instruction stream using $R_1$ (216).

In a particular embodiment, the instruction execution streams may include one or more pre-defined sequences of operations. For example, a stream of instructions may include two sequential data read operations from an associated register file, followed by one or more data execution operations. Therefore, data may be read concurrently from two register files that are associated with sequential instruction execution streams. The sets of register files 202 and 204 are arranged such that register files associated with sequential instruction execution streams are located in different sets of register files 202 and 204. In particular, the sets of register files 202 and 204 are grouped by even-numbered instruction execution streams and odd-numbered instruction execution streams.

The register files $R_0$ (206), $R_2$ (208), and $R_4$ (210) of the first set of register files 202 are associated with respective instruction execution streams that are executed non-sequentially with respect to each other. Similarly, the register files $R_3$ (212), $R_5$ (214), and $R_1$ (216) of the second set of register files 204 are also associated with respective instruction execution streams that are executed non-sequentially with respect to each other. Therefore, concurrent data access operations for the instruction execution streams do not generate a conflict on hardware resources shared among the first set of register files 202, or on hardware resources shared among the second set of register files 204.

In a particular embodiment, the first set of register files 202 are arranged to share a first set of hardware resources, and the second set of register files 204 are arranged to share a second set of hardware resources. For example, the first set of register files 202 share the first enable circuit 250. In addition, the first set of register files 202 share a first common data access resource, including one or more logic elements, such as data read logic or data write logic, and bus wiring associated with the first bus 220. The first set of register files 202 may also share other data wires, control wires, other hardware resources, or any combination thereof. Similarly, the second set of register files 204 share the second enable circuit 252. In addition, the second set of register files 204 share a second common data access resource, including one or more logic elements, such as data read logic or data write logic, and bus wiring associated with the second bus 230. The second set of register files 204 may also share other data wires, control wires, other hardware resources, or any combination thereof.

In a particular embodiment, hardware resources may be shared within the first set of register files 202 but such hardware resources may not be shared by register files of the second set of register files 204. Similarly, hardware resources may be shared within the second set of register files 204 but not shared by register files of the first set of register files 202. For example, the first bus 220 may include a first data read bus that is shared by a first register file, such as $R_0$ (206) and a third register file, such as $R_2$ (208), but the first bus 220 is not shared by a second register file, such as $R_1$ (216), or a fourth register file, such as $R_3$ (212). Similarly, the second bus 230 may include a second data read bus that is shared by the second register file $R_1$ (216) and the fourth register file $R_3$ (212), but the second bus 230 is not shared by the first register file $R_0$ (206) and the third register file $R_2$ (208). Hence, when sequential execution streams perform concurrent data read operations, such as read access to the first and second register files, the second and third register files, or the third and fourth register files, both the first data read bus and the second data read bus may be utilized, and no conflict is introduced.

The first set of register files 202 and the second set of register files 204 are physically arranged in separate regions to reduce power density during execution of operations of the multiple instruction execution streams. For example, the first set of register files 202, located in a first region, and the second set of register files 204, located in a second region, are arranged to reduce total power dissipation during data reads that occur concurrently at register files associated with sequential instruction execution streams. The first region may be located in a first power dissipation area and the second region may be located in a second power dissipation area such that an area that includes both the first and the second regions has a lower power density than a comparable area where each register file is adjacent to at least one other register file. To illustrate, concurrent data reads performed at $R_0$ (206) and $R_1$ (216) occur at physically separated, non-adjacent locations, reducing the total power density and improving chip performance, as compared to data reads performed at physically adjacent register files. As another example, concurrent data reads at $R_3$ (212) and at $R_4$ (210) occur at physically separated, non-adjacent locations of the first region and the second region, thus reducing total power density and improving chip performance.

In a particular embodiment, the configuration of the system 200 enables lower manufacturing costs by configuring register files to enable sharing of hardware resources among each set of register files 202 and 204, by reducing or eliminating conflicts across the shared resources. In addition, performance benefits are obtained due to the physical location of individual register files with respect to an order of sequential access to each of the register files, enabling reduced power density and improved chip performance.

Figure 3:
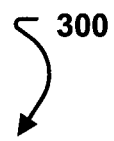
FIG. 3 is a general diagram depicting pipelined processing operations that may be executed using a register file system for pipelined processing.

Referring to FIG. 3, an illustrative embodiment of pipelined processing operations that may be performed with a register file system is depicted and generally designated 300. The operations 300 are depicted in a tabular format with columns indicating sequential time periods $T_1, T_2, T_3, T_4, T_5,$ and $T_6$, and with rows indicating pipelined instruction streams 1-6. Using instruction stream 1 as an illustrative example, a first read operation $R_1^{\ 1}$ is performed at $T_1$, followed by a second read operation $R_2^{\ 1}$ performed at $T_2$. A first execution operation $E_1^{\ 1}$ is performed at $T_3$, followed by a second execution operation $E_2^{\ 1}$ at $T_4$, and a third execution operation $E_3^{\ 1}$ at $T_5$. A data write operation $W^1$ is performed at $T_6$. Likewise, instruction stream 2 performs a first read operation $R_1^{\ 2}$ at $T_2$, a second read operation $R_2^{\ 2}$ at $T_3$, an execution operation $E_1^{\ 2}$ at $T_4$, an execution operation $E_2$ at $T_5$, and an execution operation $E_3$ at $T_6$.

Because read operations are performed at sequential time periods during pipelined processing, such as $T_1$ and $T_2$ for stream 1, read operations are performed concurrently for streams having sequential pipeline access. For example, during time period $T_2$, stream 1 performs a read operation R' concurrently with stream 2 performing a read operation $R_1^{\ 2}$. As another example, during the third time period $T_3$, stream 2 performs a read operation $R^2$ concurrently with stream 3 performing a read operation $R_1^{\ 3}$. Similarly, because each instruction execution stream includes three sequential execution steps, multiple streams perform execution steps concurrently. For example, at time period $T_6$, stream 2 is processing an execution operation $E_3$, stream 3 is processing an execution operation $E_2^{\ 3}$, and stream 4 is processing an execution operation $E_1^{\ 4}$.

In an embodiment, the instruction streams 1-6 may be executed via multiple execution pipelines of a pipelined processor. In an illustrative embodiment, the instruction streams 1-6 may be executed by an interleaved multithreaded processor. In a particular embodiment, each of the instruction streams 1-6 may be Very Long Instruction Word (VLIW) type instructions. In another embodiment, each of the instruction streams 1-6 may be superscalar type instructions.

In a particular embodiment, a register file system for pipelined processing, such as the system 200 of FIG. 2, may enable use of shared hardware resources among register files associated with streams 1-6. For example, because concurrent data read operations are only performed at register files associated with sequential streams, the register files may be arranged into groups, each group sharing a separate read data bus, so that simultaneous reads may be performed without introducing conflicts. As another example, because concurrent data write operations are not performed, a single data write bus may be used to write data at a first register file for a first instruction stream and at a second register file for a second instruction stream sequential to the first instruction stream, without introducing write conflicts.

Figure 4:
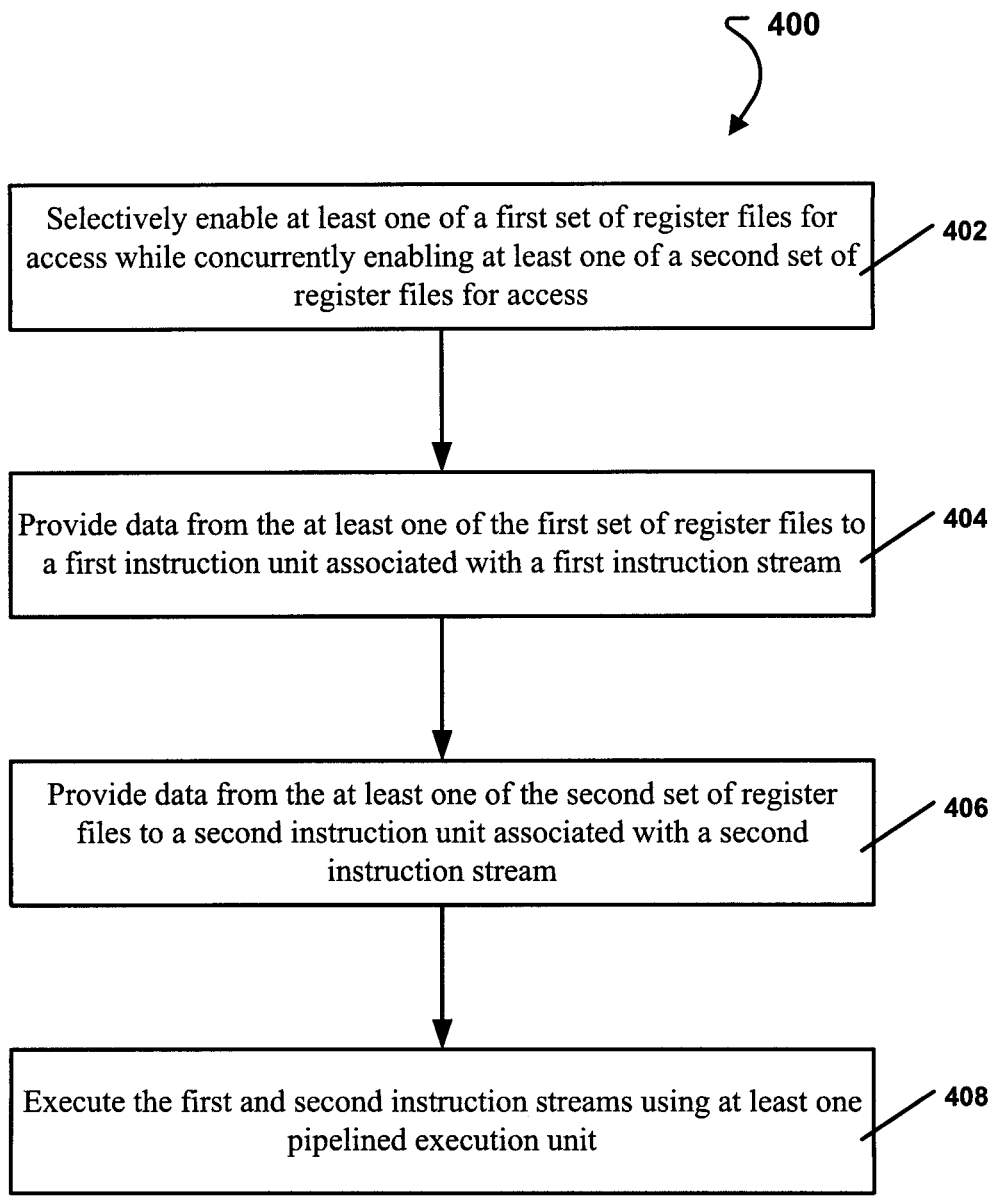
FIG. 4 is a flow chart of an embodiment of a method of using a register file for pipelined processing.

Referring to FIG. 4, an illustrative embodiment of a method of using register files for pipelined processing is depicted and generally designated 400. At least one of a first set of register files is selectively enabled for access while at least one of a second set of register files is concurrently enabled for access, at 402. For example, register file $R_2$ (208) may be accessed concurrently with register file $R_1$ (216). In a particular embodiment, the first set of register files share of a first set of hardware resources, and the second set of register files share a second set of hardware resources. For example, the first set of hardware resources may include a data read bus. In an illustrative embodiment, the first set of register files may be the first set of register files 202 and the second set of register files may be the second set of register files 204 of FIG. 2, or the execution units 108-114 depicted in FIG. 1.

Data may be provided from at least one of the first set of register files to a first instruction unit associated with the first instruction stream, at 404. At 406, data may be provided from the at least one of the second set of register files to a second instruction unit associated with the second instruction stream, at 406. The first and the second instruction streams may be executed using at least one pipelined execution unit, at 408. In a particular embodiment, the first instruction unit, the second instruction unit, and the execution unit may be execution units configured to process pipelined execution streams. In an illustrative embodiment, the execution units are the execution units 260 depicted in FIG. 2.

In an illustrative embodiment, instructions may be executed in the pipelined execution unit in a predetermined order. In a particular embodiment, each of the instructions may be executed in the pipelined execution unit as Very Long Instruction Word (VLIW) type instructions. In another embodiment, each of the instructions may be executed in the pipelined execution unit as superscalar type instructions.

Figure 5:
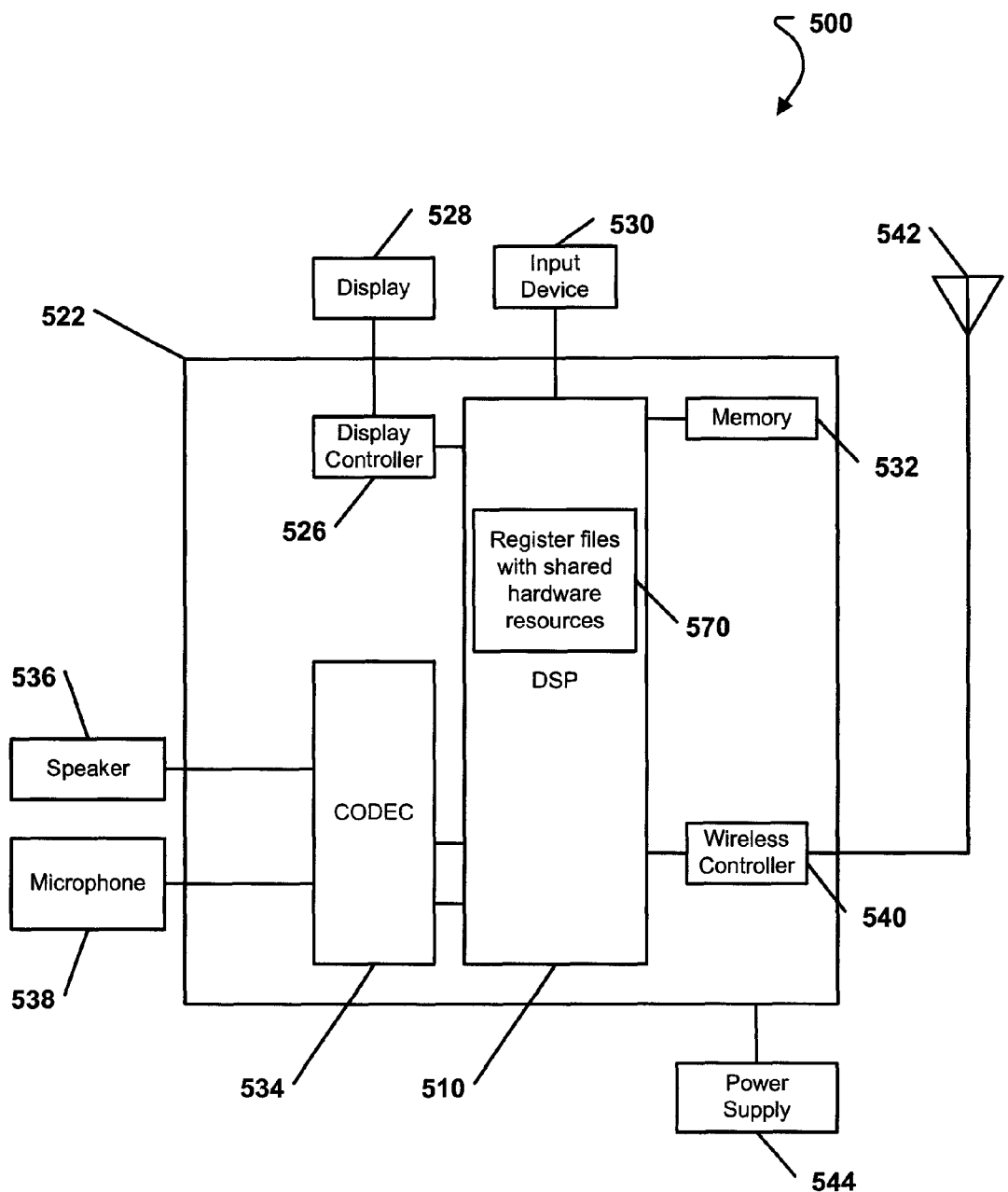
FIG. 5 is a block diagram of portable communication device including a register file system for pipelined processing.

FIG. 5 is a block diagram of a portable communication device using a register file system for pipelined processing. The portable communication device 500 includes an on-chip system 522 that includes a pipelined processor, such as a digital signal processor 510. The digital signal processor 510 includes register files with shared hardware resources 570. For example, the processor 510 and the register files with shared hardware resources 570 may include portions of the systems of FIG. 1 or 2, and may utilize the operations described in FIG. 3 or 4, or any combination thereof. In a particular illustrative embodiment, the register files with shared hardware resources 570 may enable reduced power density, reduced manufacturing costs, or both, for support of pipelined processors, such as the digital signal processor 510.

In a particular embodiment, power density may be reduced during processing by configuring the register files with shared hardware resources 570 so that adjacent register files are not accessed for data operations by sequential instruction execution streams, thereby preventing concurrent data access operations at adjacent register file locations. Likewise, manufacturing costs may be reduced by dividing the register files with shared hardware resources 570 into at least as many sets of register files as there are concurrent data access operations of a same type. For example, if two pipelined instruction execution streams concurrently perform data read operations at associated register files, as depicted in FIG. 3, at least two sets of register files may be defined, each set of register files sharing data access hardware resources among the register files of the set without generating a conflict, such as depicted in FIG. 2. As another example, if three pipelined instruction execution streams concurrently perform data read operations at associated register files, at least three sets of register files may be defined, each set of register files sharing data access hardware resources among the register files of the set, without generating a conflict within each set.

FIG. 5 also shows a display controller 526 that is coupled to the digital signal processor 510 and to a display 528. Moreover, an input device 530 is coupled to the digital signal processor 510. Additionally, a memory 532 is coupled to the digital signal processor 510. A coder/decoder (CODEC) 534 can also be coupled to the digital signal processor 510. A speaker 536 and a microphone 538 can be coupled to the CODEC 534.

FIG. 5 also indicates that a wireless controller 540 can be coupled to the digital signal processor 510 and to a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

In a particular illustrative embodiment, the register files with shared hardware resources 570 may be used to enhance overall performance of the portable communications device 500. In particular, the register files with shared hardware resources 570 may reduce power density, thereby enabling faster processing speeds, and may reduce manufacturing costs my sharing common hardware without degrading the performance of the device 500.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A processor comprising:
    a first execution pipeline to execute a first instruction stream;
    a second execution pipeline to execute a second instruction stream;
    a first register file associated with the first instruction stream;
    a second register file physically adjacent to the first register file on a chip, the second register file associated with the second instruction stream;
    wherein the first and second instruction streams are configured within the first and second execution pipelines with non-concurrent access of the first and second register files to enable the first and second register files to share at least one hardware resource;
    a third execution pipeline to execute a third instruction stream;
    a third register file physically non-adjacent to the first register file and the second register file, the third register file associated with the third instruction stream; and
    a second hardware resource including a second data read bus that is shared by the second set of register files but not shared by the first set of register files;
    wherein the first and third instruction streams are configured within the first and third execution pipelines to concurrently access the first and third register files.

2. The processor of claim 1, wherein the at least one hardware resource includes a data read bus.

3. The processor of claim 1, wherein instructions are executed in the first execution pipeline in a predetermined order.

4. The processor of claim 1, wherein each of the instructions executed in the first execution pipeline are very long instruction word type instructions.

5. The processor of claim 1, wherein each of the instructions executed in the first execution pipeline are superscalar type instructions.

6. A method of selecting register files for access, the method comprising:
    selectively enabling a first register file located in a first power dissipation region for access while concurrently enabling a second register file located in a second power dissipation region for access, wherein the first power dissipation region uses a first set of hardware resources and wherein the second power dissipation region uses a second set of hardware resources, wherein the first register file is physically non-adjacent to the second register file;
    selectively disabling a third register file, wherein the third register file is physically adjacent to the first register file in the first power dissipation region;
    concurrently providing data from the first register file to a first instruction unit associated with a first instruction stream and data from the second register file to a second instruction unit associated with a second instruction stream without providing data from the third register file based on the third register file being physically adjacent to the first register file; and
    executing the first and second instruction streams using at least one pipelined execution unit.

7. The method of claim 6, wherein the first set of hardware resources includes a data read bus.

8. The processor of claim 1, wherein the first and second register files are located in a first power dissipation region and the third register file is located in a second power dissipation region.

* * * * *